United States Patent [19]

Levene et al.

[11] 3,853,673

[45] Dec. 10, 1974

[54] STRENGTHENED GLASS ARTICLES AND METHODS USING GLASS PRECURSOR ION EXCHANGE MEDIUM

[75] Inventors: Leon Levene, Toledo, Ohio; Ian M. Thomas, Temperance, Mich.

[73] Assignee: Owens-Illinois, Inc., Toledo, Ohio

[22] Filed: Apr. 30, 1973

[21] Appl. No.: 356,071

[52] U.S. Cl............................ 161/1, 65/30, 65/60, 65/DIG. 14, 106/38.3, 106/50, 117/124 D
[51] Int. Cl...... B44f 1/00, C03c 15/00, C03c 13/00
[58] Field of Search................ 65/30, DIG. 14, 60; 106/38.3, 50; 117/129, 124 D; 161/1

[56] References Cited
UNITED STATES PATENTS

| | | | |
|---|---|---|---|
| 3,459,673 | 8/1969 | Best et al. | 65/30 X |
| 3,481,726 | 12/1969 | Fischer et al. | 65/30 |
| 3,582,395 | 6/1971 | Adams et al. | 65/30 X |
| 3,640,093 | 2/1972 | Levehe et al. | 65/134 X |
| 3,743,491 | 7/1973 | Poole et al. | 65/30 |
| 3,759,683 | 9/1973 | Dislich et al. | 65/DIG. 14 |
| 3,791,808 | 2/1974 | Thomas | 65/30 |
| 3,791,809 | 2/1974 | Lau | 65/60 |
| 3,799,754 | 3/1974 | Thomas | 65/134 |

*Primary Examiner*—S. Leon Bashore
*Assistant Examiner*—Frank W. Miga
*Attorney, Agent, or Firm*—Richard D. Heberling; E. J. Holler

[57] ABSTRACT

A strengthened glass article is prepared by applying to the surface of the article a glass precursor that is (A) a clear solution of a hydrolyzable metalloxane that is preferably a metallosiloxane that is capable of being further hydrolyzed to a cross-linked polymetalloxane or polymetallosiloxane or (B) a cross-linked polymetalloxane that is a polymetallosiloxane that has a gel structure, the cross-linked polymetallosiloxane as defined in parts A and B being prepared by reacting a metal alkoxide such as silicon alkoxide, optionally a metal alkoxide such as an aluminum alkoxide and a precursor of an alkali metal oxide such as potassium acetate, the alkali metal ion of the alkali metal oxide being larger than the alkali metal ion in the glass; and maintaining the glass article and the glass precursor at an elevated temperature sufficiently high to provide a compressive stress layer in the glass article to produce the strengthened article.

20 Claims, No Drawings

3,853,673

STRENGTHENED GLASS ARTICLES AND METHODS USING GLASS PRECURSOR ION EXCHANGE MEDIUM

THE INVENTION

This invention relates to a method of strengthening silicate glass articles containing alkali metal ions in which the alkali metal ions in the surface layer of the glass article are replaced by different alkali metal ions from an external source at elevated temperatures.

In the manufacture of glass articles and particularly in the manufacture of glass containers in high speed production lines, it is desirable to strengthen the containers without lowering the production capacity of the container plant. It is also desirable to use an ion exchange medium that does not require a prolonged immersion of an article in a molten salt bath—the container being subject to thermal shock when introduced into the bath. Furthermore, the accidental spilling or organic material into the bath, such as a workman's lunch bag, will cause an explosion in the molten salt bath.

The use of rubidium and cesium molten salt baths is quite expensive in addition to the drawbacks stated above.

It is also desirable to apply the ion exchange medium from an alcoholic solution or a suspension of a material instead of a molten salt bath. Suitable ways of applying the ion exchange medium in the above form to glass articles are by dipping or spraying which again lends itself to high production line techniques.

It is also an advantage to be able to spray the ion exchange medium onto either cold or hot glassware, and it is advantageous to use very pure ion exchange media.

It is an object of the present invention to provide a method of strengthening glass articles, particularly silicate glass articles, by applying to the surface an ion exchange medium that is a glass precursor that is a cross-linked polymetalloxane such as a polymetallosiloxane having a gel structure or a material that is hydrolyzable and convertible to a cross-linked polymetalloxane or polymetallosiloxane such as a further hydrolyzable metallosiloxane formed from a silicon alkoxide, optionally a metal alkoxide such as an aluminum alkoxide, and a precursor of an alkali metal oxide, the alkali metal ion of the alkali metal oxide being larger than the alkali metal ion in the glass and causing the compressive stress layer in the glass article when the article with the glass precursor coating is maintained at an elevated temperature sufficiently high to cause the ion exchange.

It is an object of the present invention to provide a strengthened glass article comprising a glass body having a compressive stress layer at least on one surface and a coating on the body ajdacent to the stress layer, the coating being formed by a glass precursor that is (A) a clear solution of a soluble, further hydrolyzable metalloxane, metallosiloxane, or siloxane that is capable of being further hydrolyzed to a crosslinked metalloxane or polymetallosiloxane, soluble, further hydrolyzable polymetalloxane being formed from a metal alkoxide such as a titanium alkoxide or silicon alkoxide, optionally a metal alkoxide such as aluminum sec. butoxide, and a precursor of an alkali metal oxide such as potassium acetate, the alkali metal ion of the alkali metal oxide being larger than the alkali metal ion in the glass; or (B) a cross-linked polymetalloxane or polymetallosiloxane having a gel structure.

These and other objects will be apparent from the specification that follows and the appended claims.

The present invention provides a strengthened glass article and methods for making the same in which the method is directed to the strengthening of a silicate glass article containing an alkali metal ion in which the alkali metal ions in the surface of the glass are replaced by different alkali metal ions from an external source at elevated temperatures. The methods of the present invention provide an improvement in the above-identified method, the improvement including the steps of:

1. applying to the surface of the glass article a glass precursor that is (A) a clear solution of a soluble, further hydrolyzable metalloxane, metallosiloxane or siloxane that is capable of being further hydrolyzed to a cross-linked polymetallosiloxane or polysiloxane, the soluble, further hydrolyzable metallosiloxane being formed from a metal alkoxide such as titanium alkoxide or a silicon alkoxide, optionally a metal alkoxide, and a precursor of an alkali metal oxide, the alkali metal ion of the alkali metal oxide being larger than the alkali metal ion in the glass or (B) a cross-linked polymetalloxane or polymetallosiloxane having a gel structure; and 2. maintaining the glass article and the glass precursor at an elevated temperature sufficiently high to convert the metalloxane to a gel structure and a homogenous mixture of metal oxides, the maintaining of the glass article at the elevated temperature being for a period of time sufficient to provide a compressive stress layer in the article, but for a time insufficient to provide an ion exchange to a substantial degree in the interior portion of the glass of the article to thereby produce the strengthened glass article.

In a preferred embodiment, the method for strengthening the silicate glass article in which alkali metal ions in the surface layer of the glass article are replaced by different alkali metal ions from an external source at elevated temperatures not substantially above the strain point of the glass, the method comprising the steps of:

applying to the surface of the glass a cross-linked polymetallosiloxane, the cross-linked metallosiloxane being a reaction product of (1) a silicon alkoxide of the formula $SiX_nY_{4-n}$ where X is hydrogen, phenyl or an alkyl of 1 to 6 carbon atoms, Y is an alkoxy group from 1 to 6 carbon atoms and $n$ is 0 or 1 with less than a stoichiometric quantity of water in the presence of an effective catalytic amount of hydrolysis catalyst so as to form a clear solution of a soluble, partially hydrolyzed silicon alkoxide, (2) reacting the clear solution of the partially hydrolyzed silicon alkoxide, optionally a metal alkoxide, with a precursor of an alkali metal oxide so as to form a clear solution of a soluble, further hydrolyzable metallosiloxane, (3) reacting the clear solution of the soluble, further hydrolyzable metallosiloxane with an additional quantity of water sufficient to hydrolyze the metallosiloxane to form a solution which converts to a gel structure containing a cross-linked metallosiloxane, (4) heating the gel structure at a temperature and for a time sufficient to convert the gel structure in an oxide product and (5) optionally melting the oxide product by heating the same to densify the product to a glaze; and maintaining the glass article and the glass coating formed thereon from the cross-linked metallosiloxane gel structure at an elevated temperature sufficiently high but not substantially above the strain point of the glass for a period of time to provide a compressive stress layer in the glass article, but for a time insufficient to provide ion exchange to a substantial degree in the interior portion of the glass article to thereby produce a strengthened glass article.

The method of making the glass precursor and the glass coating on the glass article is described in U.S. Pat. No. 3,640,093 for an invention of Levene and Thomas, which patent is hereby incorporated by reference. Also incorporated by reference is a United States patent application of Leon Levene, U.S. Ser. No. 210,104 filed Dec. 20, 1971 that describes coating an inorganic substrate with a glass layer formed from a glass precursor such as the reaction product of a silicon alkoxide such as ethyl orthosilicate, a metal alkoxide such as aluminum isopropoxide, and a precursor of an alkali metal oxide such as potassium acetate.

The soluble, further hydrolyzable metalloxane and the cross-linked polymetalloxane is prepared from a metal alkoxide such as a titanium alkoxide, an aluminum alkoxide, and a silicon alkoxide or mixtures thereof.

Although the silicon alkoxide is preferred, titanium alkoxides containing alkoxy radicals with 1 to 6 carbon atoms and aluminum alkoxide containing alkoxy radicals having 1 to 6 carbon atoms can be used to provide the metalloxane that is used to prepare the clear, cross-linked polymetalloxane having a gel structure.

Suitable titanium alkoxides include titanium methoxide, titanium ethoxide, titanium propoxide, titanium butoxide and titanium neopentoxide and titanium hexoxide. Suitable aluminum oxides are aluminum methoxide, aluminum ethoxide, aluminum propoxide, aluminum sec. butoxide, and aluminum hexoxide.

The preferred silicon alkoxide is ethyl orthosilicate, although other silicon alkoxides such as methyl triethoxysilane, phenyltrimethoxysilane and methyl orthosilicate can be used.

A metal component can be introduced into the chain of the metalloxanes that is preferably a siloxane or pendant from the chain by means of a metal alkoxide and/or a metal salt. Metal as used herein is defined as comprising the metals listed in the Periodic Table including so-called metal-like elements, e.g., the metalloids. If the metal alkoxide is volatile and easily purified by distillation, it is preferred that the metal be added in this state. Examples of metals which are advantageously added as alkoxides include Al, Ti, Ge, Zr, Hf, Th, V, Nb, B, Ta, Be, Sn and P. When the metals do not form volatile alkoxides, they should be added as metal salts such as nitrates or acetates. Suitable metal salts are salts of Li, Na, K, Rb, Cs, Cu, Mg, Ca, Sr, Ba, Fe, Co, Ni, Zn, Cd, Hg, Pb, Sc, Y, Ce and rare earths La to Lu, inclusive. Other elements such as boron, vanadium, and phosphorus can be added as oxides in aqueous solutions in which they will form their respective soluble acids, e.g., boric acid, vanadic acid, and phosphoric acid. Hence, for ion exchange in accordance with the present invention, the alkali metal nitrates and acetates are preferred with generally the preferred salts being sodium acetate, potassium acetate, rubidium acetate, and cesium acetate.

As set forth in U.S. Pat. No. 3,640,093, the metal salts are used in the form of an aqueous solution generally and include those soluble metal salts which decompose to oxides below 600°C. and which react with metalloxanes that are partially hydrolyzed silicon alkoxides or soluble metallosiloxanes to form a clear solution capable of conversion to a clear gel. Suitable salt solutions are those containing soluble salts of organic acids including benzoic acid or other aromatic acids or fatty acids, alcohol acids, phenol acids and oxalic acids. Suitable soluble salts of other organic acids also include salts of formic, citric, proprionic, tartaric in which the aliphatic acids generally have from 1 to 20 carbon atoms, the aromatic acids having generally from 7 to 15 carbon atoms.

Nitrates of the alkali metals are excellent because the metal nitrates typically decompose to oxides below about 600°C. and leave no undesirable residue such as sometimes is the case of chlorides and sulfates. Carbonates and bicarbonates generally do not leave an objectionable residue.

As set forth in U.S. Pat. No. 3,640,093, the clear gel formed from the clear solution is conveniently isolated and/or recovered by suitable means and then appropriately heated so as to remove organic and free liquid components therefrom to form an oxide mixture which is convertible to a glass. Such glass precursors and glasses made by the above method have a very high purity and are homogenous.

The following examples are intended to illustrate the present invention and not to limit the same in any manner.

EXAMPLE 1

Strengthened silicate glass articles were made with a cesium alkali metal ion exchange for a sodium ion. Glass rods were prepared for coating with an ion exchange medium, the rods having the following formulation by weight:

| Ingredients | Percent by Weight | |
|---|---|---|
| | Composition No. 1 | Composition No. 2 |
| $SiO_2$ | 67.7 | 59.4 |
| $Al_2O_3$ | 2.8 | 18.1 |
| $Na_2O$ | 15.6 | 13.2 |
| CaO | 5.6 | — |
| MgO | 4.0 | 2.1 |
| $B_2O_3$ | 1.5 | 3.5 |
| $K_2O$ | 0.6 | 3.8 |
| BaO | 2.0 | — |
| Annealing Point °F. | 978 | 1075 |

Coating solutions were prepared from metal alkoxide and metal acetate mixtures which produced, upon hydrolysis and subsequent thermal degradation, glass precursor coatings that were a homogenous mixture of metal oxides of the following approximate compositional ranges:

| Ingredients | Percent by Weight |
|---|---|
| $SiO_2$ | 20 – 60 |
| $Al_2O_3$ | 1 – 5 |
| $B_2O_3$ | 5 – 10 |
| $Cs_2O$ | 25 – 75 |

One specific coating solution was prepared by mixing and heating at 75°C. for 20 minutes ethyl orthosilicate (22.2 grams, 0.107 m), ethanol (25 ml.), water (1.92 grams, 0.107 m), and two drops of 1N HCl. Aluminum isopropoxide (2.0 grams, 0.0098 m) was added to the clear warm solution. An exothermic reaction took place and the solution cleared within minutes. Next, there was added $B_2O_3$ (1.9 grams, 0.0273 m) which had been previously dissolved by heating in a mixture of n-butanol (30 ml) and glacial acetic acid (20 ml). Finally, cesium acetate (15.6 grams, 0.081 m) was added after being dissolved in 60 mls. water with some heating. The resultant solution was used for coating the glass rods. In addition, inasmuch as the above-described solution gels within about 20 minutes, other similar solutions were used in the form of the gel, a good dispersion being obtained when the gel (after being dried in a vacuum oven at about 100°C. for at least 2 hours) is stirred vigorously in a polar solvent such as methanol for several minutes. Hence, the resultant solution can be used before gelling or after gelling. In general, similar solutions have been observed to gel within a time period of 5 minutes to several hours, depending upon the formulation. The gel dispersion is quite stable and was readily adaptable for coating glass rods.

The glass rods, having the formulation as previously described, were cleaned by heating at 300°–350°C. for several hours. The cooled rods were then dipped into the above-described gel dispersion or clear coating solution and allowed to dry for ten minutes. A second coating was placed on some of the rods if a continuous film was not obtained initially.

The rods were placed in a 130°C. oven for ten minutes to remove solvents. Coatings on the rods were uniform and continuous and they were heated in a non-draft oven for the required treatment time. The coatings were converted to a high purity homogenous mixture of oxides as previously described. In most cases, the coatings after this treatment ranged in color from light tan to black. The resultant rods were heated with the glass precursor coating thereon at 850°F. for the ion exchange step that formed a high strength compressive layer as indicated below.

| Comp. No. | Treatment Time (hrs) | Temperature °F. | Modulus of Rupture (psi) | Depth (microns) |
|---|---|---|---|---|
| 1 | 2 | 850 | 43,000 | 5 |
| 2 | 2 | 850 | 54,000 | 7 |

Blanks were run by taking glass rods through the same heat treatment but containing no coatings. The following modulus of rupture in psi was obtained: No. 1 — 19,000 psi and No. 2 — 18,000 psi. In the case of rods (compositions Nos. 1 and 2) and the blanks, the modulus of rupture results were the average of at least five samples.

It can be seen that improvements up to about 300 percent were obtained by the treatment with the glass precursor as the ion exchange medium.

The modulus of rupture results were obtained with a Tinius-Olson testing machine using a 4-point loading as described, for instance, in the Graham U.S. Pat. No. 3,473,906 and the Grubb and LaDue U.S. Pat. No. 3,498,773, which are incorporated by reference.

As previously indicated, substantially equivalent results were obtained by using other precursors of alkali metal oxides including potassium acetate and rubidium acetate.

EXAMPLE 2

Glass rods having the following approximate composition were prepared according to the description set forth in Example 1:

| Ingredients | Percent by Weight |
|---|---|
| $SiO_2$ | 68.5 |
| $Al_2O_3$ | 19.4 |
| $Na_2O$ | 0.5 |
| $Li_2O$ | 3.9 |
| $ZnO$ | 2.0 |
| $TiO_2$ | 1.8 |
| $ZrO_2$ | 1.4 |
| Annealing Temperature | 1210°F. |

Glass rods as described above were coated with a glass precursor, the latter then converted to a homogenous mixture of metal oxides and used as an ion exchange medium. The coating solution was similar to that described in Example 1 except that the different alkali metal acetate, namely sodium acetate, in an amount of 0.122 moles, was used to prepare the mixture of oxides from the soluble, further hydrolyzable metallosiloxane.

Relatively deep compression layers were developed by the sodium ion for lithium ion exchange. Apparently the lithium ion, due to its small size, migrates much faster than the sodium or potassium ion and generally the sodium for lithium exchange achieves depths of nearly 90 to 100 microns within 5 to 10 minutes. Results obtained are indicated in the table below including the temperatures of the ion exchange treatment:

| Treatment (Min.) | Temperature (°F.) | Modulus of Rupture (psi) | Depth (Microns) |
|---|---|---|---|
| 3 | 650 | 47,000 | 12 |
| 10 | 650 | 35,430 | 16 |
| 3 | 850 | 54,350 | 70 |
| 10 | 850 | 36,300 | 80–90 |
| 60 | 800 | 37,280 | 280 |
| 30 | 800 | 43,000 | 220 |

Blanks were run by taking rods through the same treatment but containing no glass precursor coating. The rods were heated at 800°F. from 30 to 60 minutes. The modulus of rupture averaged 19,000 psi, there being an average of three rods run at 60 minutes and three rods run at 30 minutes at 800°F.

It can be seen that improvements up to 300 percent are obtained by the ion exchange with cross-linked polymetallosiloxane gel that is converted to a pure, homogenous mixture of metal oxides that, in turn, is a precursor for a glass coating.

The substitution of titanium alkoxides and aluminum alkoxides for the silicon alkoxide used in the working examples provides good results although the silicon alkoxide and subsequent siloxanes or metallosiloxane are preferred.

Other metal organic coatings containing an alkali metal oxide precursor from an alkali metal salt such as potassium acetate, potassium nitrate, etc. can be used to prepare outstanding ion exchange media containing great purity and homogeneity. The resultant rods are strengthened readily without the use of hazardous molten salt bath which also provides the danger of breakage of the glass articles due to thermal shock. Other solutions of metal salts (that decompose below 600°C.) that can be used in place of the particular salts of acetates shown in the examples to provide substantially equivalent results are potassium nitrate, rubidium nitrate, cesium carbonate, cesium nitrate, cesium formate and cesium tartarate as previously described.

Metal organic coatings containing an alkali metal oxide precursor that provides a mixture of alkali metal ions such as rubidium and potassium in the ion exchange medium can be used to produce outstanding strengthened glass articles. Hence, a metal organic coating using an alkali metal oxide precursor that is a mixture of potassium acetate and rubidium acetate provides excellent results with a single ion exchange heat treatment.

What is claimed is:

1. In a method of strengthening a silicate glass article containing alkali metal ions in which the alkali metal ions in the surfacelayer of the glass are replaced by different alkali metal ions from an external source at elevated temperatures, the improvement comprising the steps of:
   1. applying to the surface of the glass article a glass precursor that is (A) a clear solution of a soluble, further hydrolyzable metallosiloxane that is capable of being further hydrolyzed to a cross-linked polymetallosiloxane, the soluble, further hydrolyzable metallosiloxane being formed from a silicon alkoxide and a precursor of an alkali metal oxide, the alkali metal ion of the alkali metal oxide being larger than the alkali metal ion in the glass; and
   2. maintaining the glass article and the glass precursor at an elevated temperature sufficiently high to convert the metallosiloxane as defined in part (A) to a cross-linked polymetallosiloxane gel structure and a glass structure containing the alkali metal ion that is larger than the alkali metal ion in the glass, the maintaining of the glass article at the elevated temperature being for a period of time sufficient to form a compressive stress layer in the glass article from the glass precursor formed from the cross-linked polymetallosiloxane to thereby produce a strengthened glass article.

2. In a method of strengthening a silicate glass article containing alkali metal ions in which the alkali metal ions in the surface layer of the glass are replaced by different alkali metal ions from an external source at elevated temperatures, the improvement comprising the steps of:
   1. applying to the surface of the glass article a glass precursor that is (A) a cross-linked polymetallosiloxane having a gel structure that is formed from a clear solution of a soluble, further hydrolyzable metallosiloxane that is capable of being further hydrolyzed to a cross-linked polymetallosiloxane, the soluble, further hydrolyzable metallosiloxane being formed from a silicon alkoxide, a metal alkoxide capable of forming a clear solution of a further hydrolyzable metallosiloxane when silicon alkoxide is used to form the metallosiloxane, and a precursor of an alkali metal oxide, the alkali metal ion of the alkali metal oxide being larger than the alkali metal ion in the glass; and
   2. maintaining the glass article and the glass precursor at an elevated temperature sufficiently high to convert the metallosiloxane having a gel structure to a glass structure, the maintaining of the glass article at the elevated temperature being for a period of time sufficient to form a compressive stress layer in the glass article from the glass precursor that is the cross-linked polymetallosiloxane to thereby produce a strengthened glass article.

3. In a method of strengthening a silicate glass article containing alkali metal ions in which the alkali metal ions in the surface layer of the glass are replaced by different alkali metal ions from an external source at elevated temperatures, the improvement comprising the steps of:
   1. applying to the surface of the glass article a glass precursor that is capable of being converted to a cross-linked polymetallosiloxane gel structure, the cross-linked polymetallosiloxane being formed from a clear solution of a soluble, further hydrolyzable metallosiloxane that is capable of being further hydrolyzed to a cross-linked polymetallosiloxane, the soluble, further hydrolyzable metallosiloxane being formed from a silicon alkoxide and a precursor of an alkali metal oxide, the alkali metal ion of the alkali metal oxide being larger than the alkali metal ion in the glass;
   2. converting the glass precursor to a homogenous mixture of metal oxides to form a coating thereon; and
   3. maintaining the glass article and the glass precursor at an elevated temperature sufficiently high and for a period of time sufficient to provide a compressive stress layer in the glass article from the glass precursor containing the alkali metal oxide that has the alkali metal ion that is larger than the alkali metal ion in the glass to thereby produce a strengthened glass article.

4. A method for strengthening a silicate glass article containing alkali metal ions in the surface layer thereof which are replaced by different alkali metal ions from an external source and elevated in temperatures not substantially above the strain point of the glass, the method comprising the steps of:
   1. applying to the surface of the glass article a clear solution of a glass precursor, the precursor being prepared by (A) combining a silicon alkoxide of the formula $SiX_nY_{4-n}$ in which X is hydrogen, phenyl or an alkyl of 1 to 6 carbon atoms, Y is an alkoxy group of 1 to 6 carbon atoms and n is 0 or 1, with less than a stoichiometric quantity of water in the presence of an effective catalytic amount of an acid hydrolysis catalyst so as to form a clear solution of a partially hydrolyzed silicon alkoxide having residual alkoxy group, (B) reacting the clear solution of step (A) that is a partially hydrolyzed silicon alkoxide with a metal alkoxide and a precursor of an alkali metal oxide so as to form a clear solution of a soluble, further hydrolyzable metallosiloxane, (C) reacting the clear solution of step (B) with an additional quantity of water to hydrolyze the metallosiloxane so as to form a clear solution;
   2. heating the resultant precursor of step (C) to a temperature and for a time sufficient to convert the same to a homogenous mixture of metal oxides; and 3. heating and maintaining the glass article and the mixture of metal oxides at an elevated temperature sufficiently high and for a period of time to provide a compressive stress surface layer in the glass article from the mixture of the metal oxides to thereby produce a strengthened glass article.

5. A method as defined in claim 4 in which there is also reacted with the metallosiloxane and the additional water in step (C) a metal compound which decomposes to an oxide below about 600°C. the metal compound being an alkali metal compound that decomposes to an alkali metal oxide.

6. A method as defined in claim 5 in which the alkali metal compound is an alkali metal acetate.

7. A method as defined in claim 6 in which the alkali metal compound is potassium acetate.

8. A method as defined in claim 6 in which the alkali metal compound is sodium acetate.

9. A method as defined in claim 6 in which the alkali metal compound is rubidium acetate.

10. A method as defined in claim 6 in which the alkali metal compound is cesium acetate.

11. A method as defined in claim 4 in which the silicon alkoxide is ethyl orthosilicate.

12. A method as defined in claim 4 in which the silicon alkoxide is methyl orthosilicate.

13. A method as defined in claim 4 in which the metal alkoxide is aluminum sec. butoxide.

14. A method as defined in claim 4 in which the precursor of the alkali metal oxide is an alkali metal acetate.

15. A method as defined in claim 14 in which the alkali metal acetate is sodium acetate.

16. A method as defined in claim 14 in which the alkali metal acetate is potassium acetate.

17. A method as defined in claim 4 in which the glass precursor provides a glass of the following approximate composition:

| Ingredient | Percent by Weight |
|---|---|
| $SiO_2$ | 19 – 60 |
| $Al_2O_3$ | 1 – 5 |
| $B_2O_3$ | 5 – 10 |
| $K_2O$ | 25 – 75 |

18. A method as defined in claim 4 in which the silicate glass article has the following approximate composition:

| Ingredient | Percent by Weight |
|---|---|
| $SiO_2$ | 67.7 |
| $Al_2O_3$ | 2.8 |
| $Na_2O$ | 15.6 |
| CaO | 5.6 |
| MgO | 4.0 |
| $K_2O$ | 0.6 |
| $B_2O_3$ | 1.5 |
| BaO | 2.0 |

19. A method of strengthening a silicate glass article containing alkali metal ions in which the alkali metal ions of the surface layer are replaced by different alkali metal ions from an external source at elevated temperatures, in which the different alkali metal ions are larger than the alkali metal ions of the surface layer, the method comprising the steps of:

1. spraying a clear solution of a glass precursor in an alcoholic solvent to the surface of the glass article while at an elevated temperature, the precursor being prepared by (A) reacting a silicon alkoxide having 4 alkoxy groups of 1 to 6 carbon atoms with about 0.3 to about 1.5 equivalents of water per equivalent of the silicon alkoxide at a pH of about 2.5 to 5 to provide a clear solution of the partially hydrolyzed silicon alkoxide, (B) reacting the clear solution of part (A) with a metal alkoxide of the formula $M(OR')_z$ where M is a metal cation, R' is an alkyl group of 1 to 6 carbon atoms and z is an integer that depends upon the valence of the cation, to provide a clear solution of a soluble, further hydrolyzable metallosiloxane, (C) reacting the clear solution of (B) with additional water and a metal compound that is convertible to a metal oxide, sufficient water being employed to react with residual alkoxy groups to provide a clear solution, and (D) adjusting the pH of the clear solution of part (C) to a pH of about 1.5 to 1;

2. heating the resultant precursor coating of step 1 for a time sufficient to convert the same to a glass coating at a temperature below the annealing temperature of the glass article; and 3. maintaining the glass article and the glass coating thereon at an elevated temperature not substantially above the strain point of the glass article and at an elevated temperature for a period of time sufficient to provide a compressive stress layer in the glass article from the glass coating formed from the glass precursor to thereby produce a strengthened glass article.

20. A strengthened glass article made by the method of claim 1.

* * * * *